United States Patent [19]

Mohney et al.

[11] 4,225,035
[45] Sep. 30, 1980

[54] GUIDE RAIL SYSTEM FOR USE ON INSPECTION MACHINES

[75] Inventors: Harold F. Mohney, Maumee, Ohio; Darius O. Riggs, Ottawa Lake, Mich.

[73] Assignee: Owens-Illinois, Inc., Toledo, Ohio

[21] Appl. No.: 938,563

[22] Filed: Aug. 31, 1978

[51] Int. Cl.$^2$ .............................................. B65G 21/20
[52] U.S. Cl. ................................... 198/836; 198/344
[58] Field of Search ............. 198/836, 344, 379, 411; 209/538, 912; 250/223 B

[56] References Cited

U.S. PATENT DOCUMENTS

| | | | |
|---|---|---|---|
| 2,812,846 | 11/1957 | Nordquist | 198/379 |
| 3,313,409 | 4/1967 | Johnson | 209/525 |
| 3,393,799 | 7/1968 | Schmersal | 209/527 |
| 3,647,051 | 3/1972 | Didas | 198/836 X |
| 3,788,457 | 1/1974 | Valentino, Jr. | 198/836 |

*Primary Examiner*—Jeffrey V. Nase
*Attorney, Agent, or Firm*—D. T. Innis; M. E. Click; D. H. Wilson

[57] ABSTRACT

A multiple station inspection glassware inspection machine in which the containers are moved from station to station by engagement with a changeable, cylindrical pocket with a plurality of these pockets assembled to form an endless structure similar to a chain. Each of the semi-cylindrical pockets is adapted to engage the sidewall of the containers and to effect the indexing movement of the containers from an inlet where they are received from a conveyor and to carry the containers through a plurality of inspection stations. Various inspections may be carried out at the stations. Each container, after having moved through all of the stations, is returned to the conveyor. As each of the containers is moved through the series of positions while engaged in the pockets, they are retained in the posckets by the positioning of a guide rail system which effectively confines the bottles to the semi-cylindrical pocket of the indexing system. Details of the rail system, which is made up of a plurality of substantially identical rail supports spaced circumferentially about the pocketed indexing system, has unique configurations with regard to the actual bottle-engaging members which are provided on the holders or supports for the rails. Also illustrated, at one station, is a portion of the guide rail system which is provided with an opening within which a driven, bottle-engaging wheel is mounted to effect rotation of the bottle at this station.

2 Claims, 8 Drawing Figures

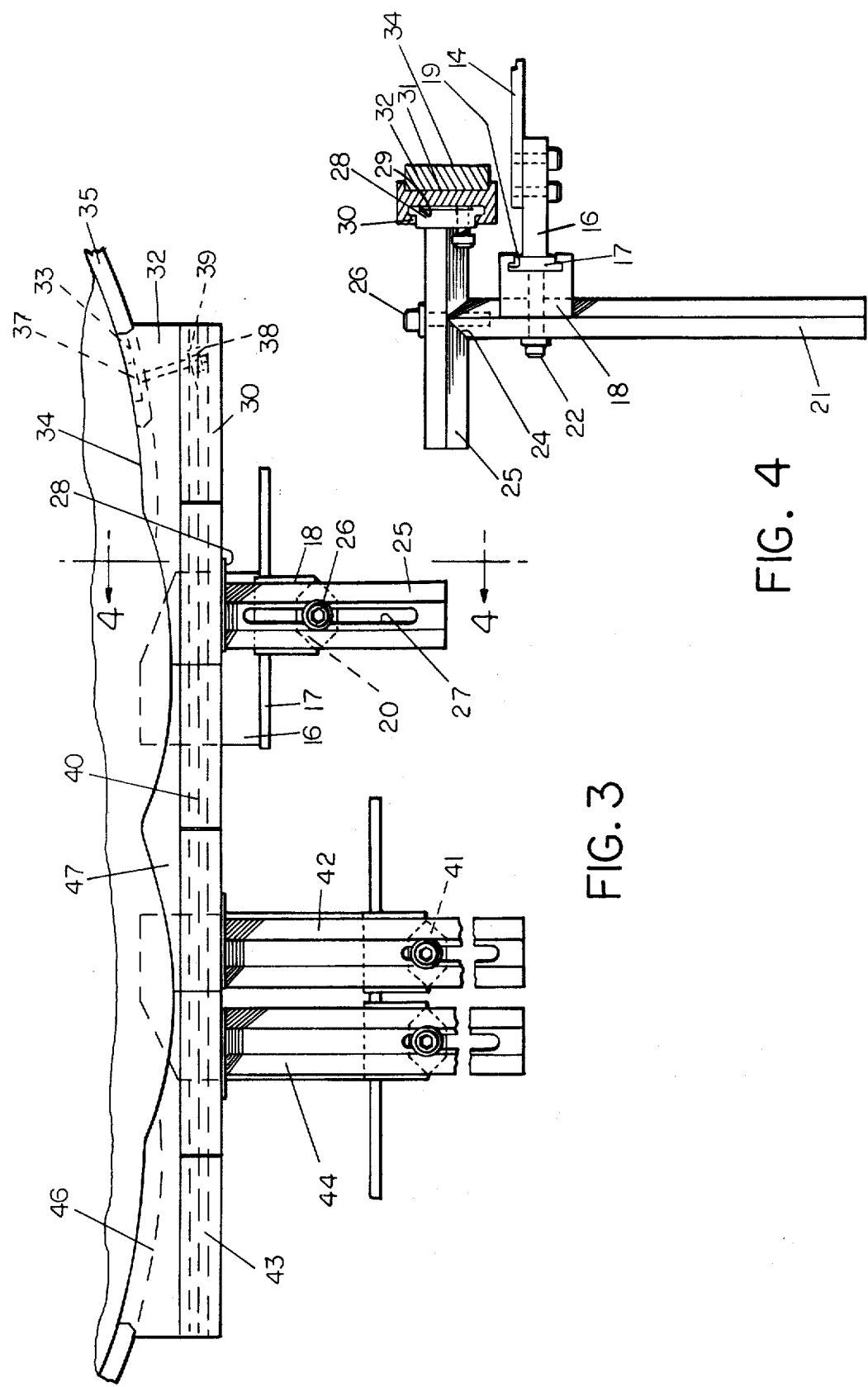

GUIDE RAIL SYSTEM FOR USE ON INSPECTION MACHINES

In the handling of glass containers through inspection equipment such as that shown and described in U.S. Pat. Nos. 3,393,799 dated July 23, 1968, or 3,313,409, a container-engaging member was employed to keep the containers in the pockets of the starwheel. The container-engaging member has taken various forms, such as a rod or bar as disclosed in the above-cited U.S. patents.

It has been the practice in the past to provide bottle-indexing systems for carrying containers through a plurality of inspection positions. These indexing drive systems have generally taken the configuration of a plurality of cut-outs or pockets formed in an indexing disc. The containers are retained within the pockets of the disc usually by a side-engaging rail in the form of a rod, as shown in the above-cited U.S. Pat. No. 3,393,799. Usually it is possible to adjust the spacing of the rod relative to the pockets in the indexing discs to generally accommodate different sized ware. Most recently, a multiple pocket indexing system has been developed in which a plurality of individual bottle-engaging pockets are joined end to end to form an endless chain. With the development of this elongated or somewhat elliptical bottle-handling system for container inspection, it has become desirable to design a less abrasive rail system for maintaining the ware or bottles in the pockets of the indexing mechanism. It is with this indexing system in mind that the new rail system of the invention was developed.

The present application discloses an improved rail system for retaining containers within the pockets of an indexing system which is described in U.S. application, Ser. No. 936,973 filed Aug. 25, 1979. In the inspection of glass containers, particularly of the multiple station type, it is desirable that the equipment used be of a generally standard nature so as to obviate a large inventory of special parts.

In the present invention, the guide rail systems for retaining glass containers within the pockets of an indexing system is provided in which the guide rails are of general configuration with only portions thereof which are of specifically designed configuration. The rail system is adjustable both vertically and horizontally so as to accommodate containers of varying heights and diameters. Further, the adaptability of the rail system of the invention to many different sizes of ware that are produced and are to be inspected adds to the usefulness of the present invention.

SUMMARY OF THE INVENTION

In a multiple station, glass container inspection machine wherein the ware is moved from station to station by an indexing of a series of pocket-like members, the ware is maintained in the pockets by a side-engaging rail system comprised of a plurality of individual rail sections having a predetermined bottle-engaging configuration and when the rail sections are assembled, they form an uninterrupted rail that surrounds the outer periphery of the inspection machine. Each rail section comprises a vertical post which is adjustably mounted to the inspection machine with a horizontal rod carrying a mounting member joined to the vertical post by a horizontal rail-supporting member adjustably mounted by a dovetail and slot cooperating to provide an adjustable rail system.

BRIEF DESCRIPTION OF THE DRAWINGS

FIG. 3 is a top plan view of the rail of FIG. 2;

FIG. 4 is a vertical, sectional view taken at line 4—4 of FIG. 3;

DETAILED DESCRIPTION OF THE DRAWINGS

Figure 1:
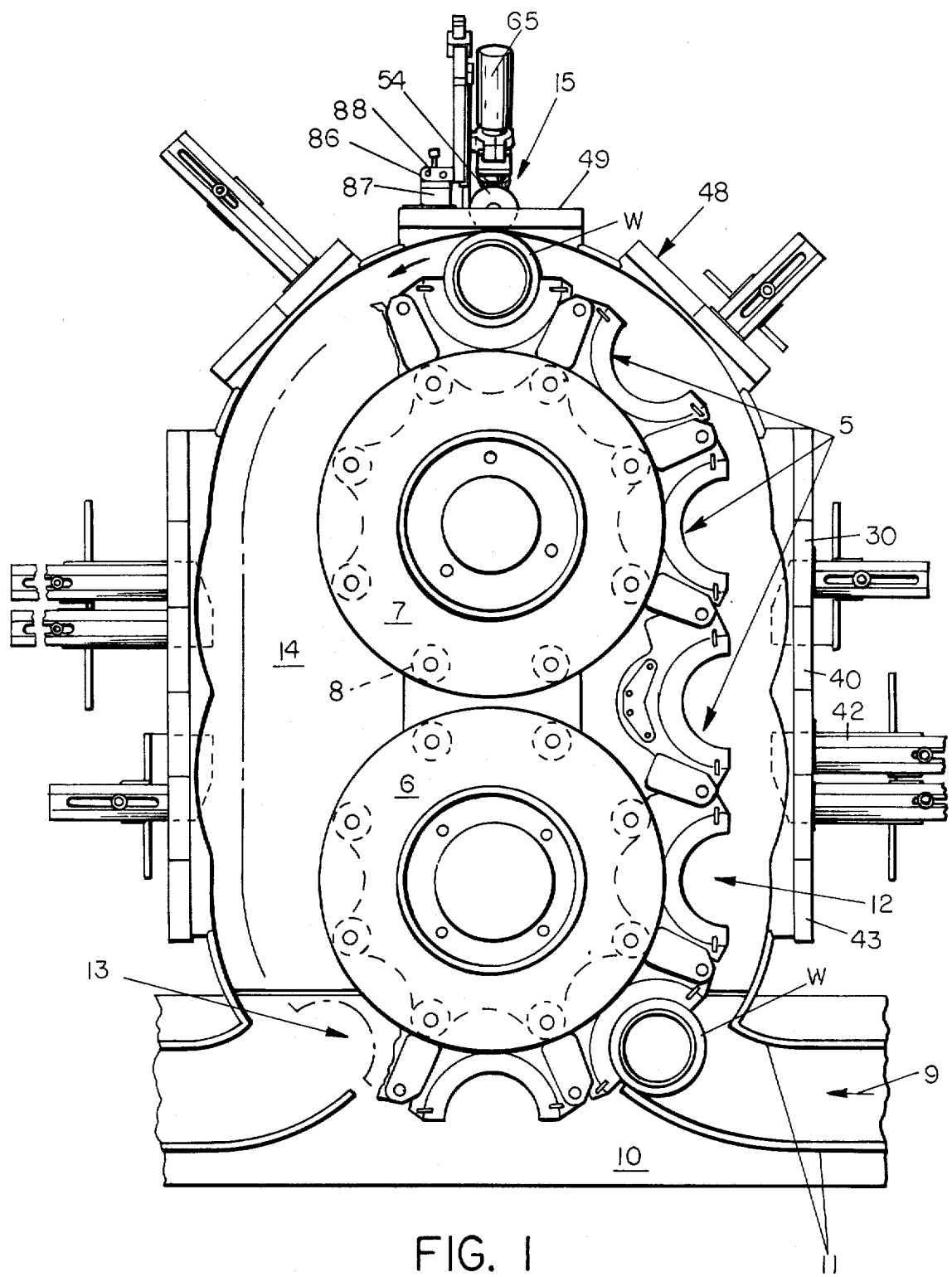
FIG. 1 is a top plan view of the apparatus of the invention.

For a general understanding of the bottle-engaging and indexing system, reference should be had to U.S. application Ser. No. 936,973 above cited.

This application shows in some detail the use of a plurality of bottle-engaging pocket members 5 which are connected together to form, in effect, an endless chain of pockets extending circumferentially about a pair of discs 6 and 7 that drivingly engage the pocket members 5 through a plurality of rollers 8 carried thereby. Ware to be inspected will be moved in the direction of the arrow 9 on conveyor 10 and guided into a pocket by the schematically shown incoming guides 11. Once the ware "W" enters a pocket 5 at the incoming position, the discs 6 and 7 will be indexed so as to place the next empty pocket into position at the inlet adjacent the guides 11. The ware will then be moved from the inlet to a first station generally designated 12. While the containers are held in the first station 12, they may have any of a number of physical measurements made. For example, a "spike" detector or "plug gauger" might be positioned at this station and the container will be retained in station 12 for a period sufficient to have the desired inspection made. It should be understood that there may be inspections taking place at each of the positions of the pocket members 5 throughout the full length of the system, with the exception of the pocket positioned at the outlet, which is shown at 13 and the empty pocket between the inlet and outlet. The ware that has been brought to the outlet position 13 will be moved to the left, as viewed in FIG. 1, and the conveyor 10 will carry the ware out of the gauging system.

As previously stated, the pocket member between the inlet and exit ends of the handling system will be without any container or ware positioned therein. It should be understood that, generally speaking, the entire under surface of the inspection machine, at approximately the conveyor height, will be formed of a table 14 on which the ware will be supporting during its movement from the inlet to the exit. At some of the stations, however, there may be mechanisms for rotating the ware. These ware-rotation systems may involve the use of a rotatable pad or disc which is positioned within an opening in the table surface, or may take the form of a ware-rotating system that is specifically shown generally at 15 in FIG. 1 and described in detail in conjunction with FIGS. 5-7.

Figure 2:
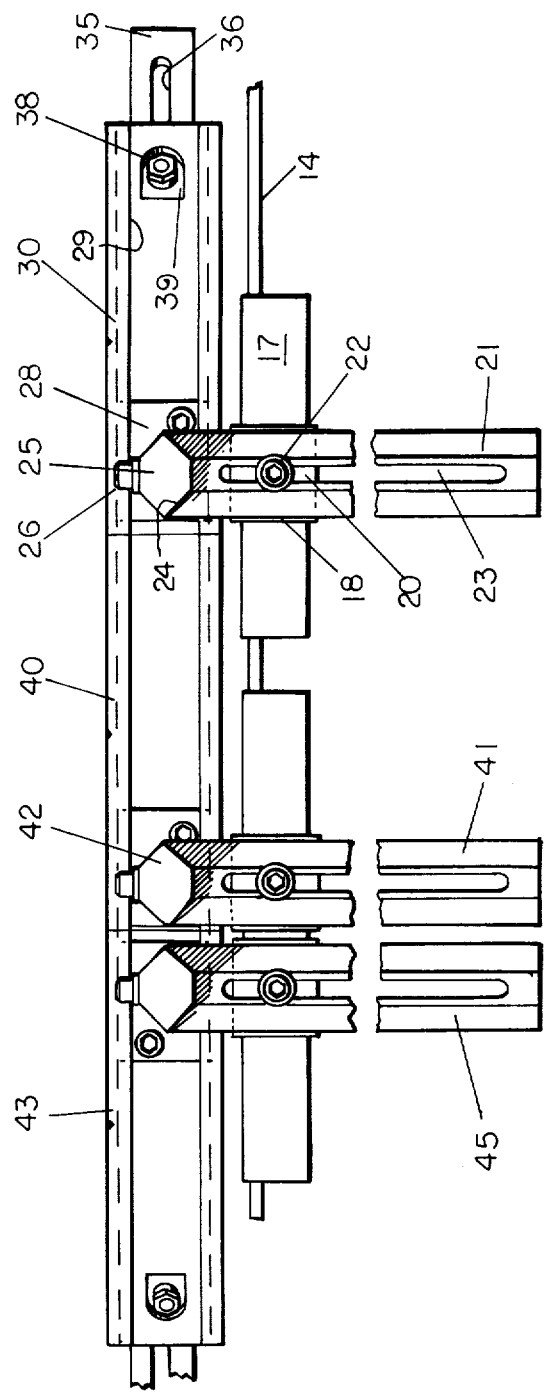
FIG. 2 is a side elevational view of a section of the guide rail of the invention of FIG. 1 on an enlarged scale.
Figure 8:
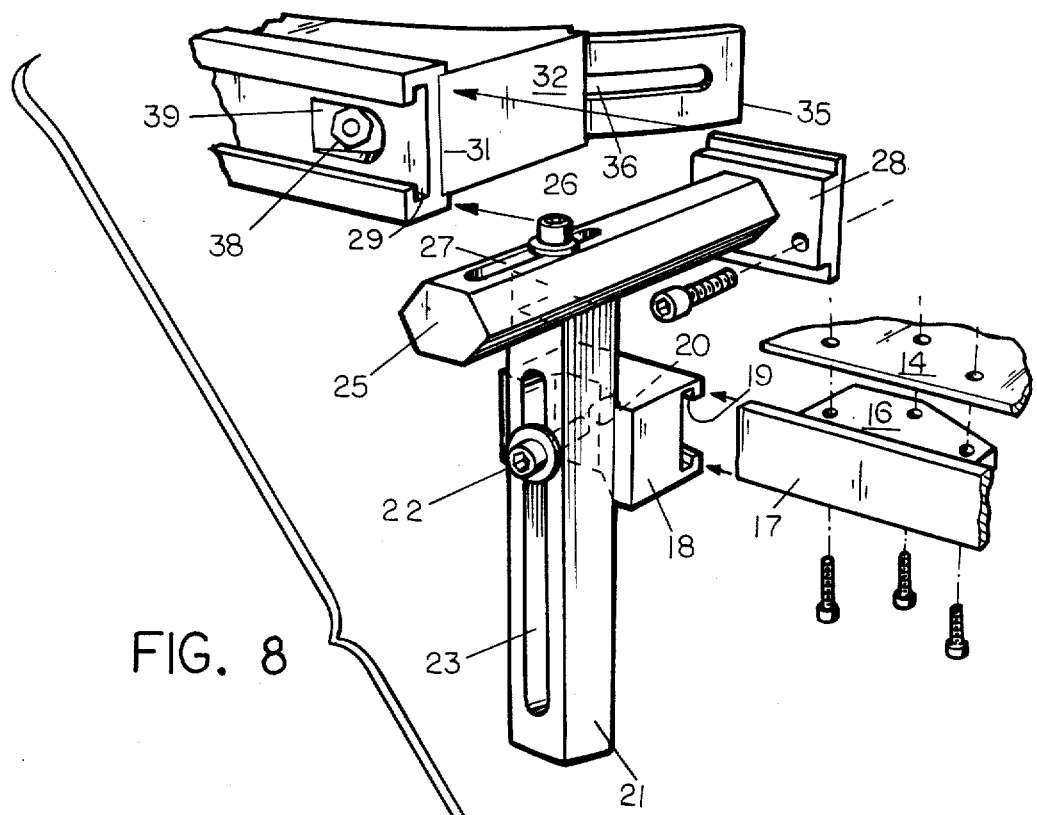
FIG. 8 is an exploded, perspective view of one section of the guide rail of the invention.

Turning specifically to FIGS. 2–4, the guide rail system will be described in detail. The table 14 will have fixed to its underneath surface on outwardly extending bracket 16. To the portion of the bracket 16, which extends from under the table 14, there is provided a longitudinally extending, but vertically positioned, dovetail member 17. A mounting block 18 having a dovetail slot 19 formed in one face thereof is mounted on the dovetail member 17 and may be moved relative thereto in a horizontal direction. The block 18 at its side remote from the dovetail slot 19, is provided with a generally V-shaped, vertical cut-out 20. A vertical post 21 having a generally V-shaped external surface is positioned within the cut-out 20 and the post 21 is retained in the cut-out 20 by a bolt 22. The bolt 22 extends through a vertical slot 23 formed in the post 21, thus providing vertical adjustment of the post 21 relative to the mounting block 18. The upper end of the post 21 generally takes the configuration of a semi-hexagonal shape at 24. A generally hexagonal shaped, horizontal bar 25 is positioned in the semi-hexagonal shaped slot 24, with the bar being retained atop the post 21 by a bolt 26. The bolt 26 extends through a horizontal slot 27 and in this manner the bar 25 is horizontally adjustable relative to the post 21. To the forward extending end of the bar 25, is attached a dovetail member 28. The member 28 fits within a dovetail slot 29 formed in the back of an enlongated supporting member 30. The front of the supporting member 30 is provided with a slightly recessed face 31. To this face 31 is mounted a ware-engaging block 32. The block 32, as best shown in FIGS. 2 and 3, is provided at the right-hand end, as viewed in FIGS. 3 and 8, with an undercut at 33 in a face 34 thereof which engages the ware. Within this undercut is positioned a gap spanning member 35. Member 35 has a generally curved configuration adapted to lie within the undercut 33. The member 35 also is provided with an elongated slot 36 which extends substantially the full length thereof, with the exception of the extreme ends. This slot serves as an opening through which a bolt 37 will extend. The shank of the bolt will extend through the slot 36 and through a hole formed in the block 32.

A nut 38, access to which may be provided through an opening 39 in the supporting member 30, is threaded to the bolt 37. It can readily be seen that by loosening the nut 38, the bolt 37 will be loosened and the gap spanning member 35 may then be adjusted lengthwise relative to the block 32. In this manner the member 35 may be extended in the event the guide rails are moved outwardly relative to the table to accommodate the apparatus for larger diameter ware. This adjustability is important, as explained above, with regard to the ability of the rail system to be utilized for various sizes of ware being handled by the mechanism. It is important that the ware-engaging portions of the rail sections be smooth, continuous, and free of any projections.

The specifically described guide rail section found in FIGS. 2–4, is that section appearing at the right of FIG. 1. The supporting member 30 will be positioned adjacent a similar supporting member 40, with the supporting member 40 supported by a vertical post 41 to the top of which is mounted a horizontal bar 42. Abutting the member 40 is another supporting member 43 which is carried by a horizontal bar 44 mounted on a vertical post 45. The member 43 will carry a block 46 which is essentially identical to the block 32 except being reversed. The intermediate supporting member 40 carries a block 47 which has a configuration such that it matches the ends of the blocks 32 and 46 and then has an outwardly extending intermediate shape, with the widest portion thereof serving to engage the containers while they are in station and held by the opposed pocket 5. The curves in the blocks are required so that movement between stations will be smooth.

A similar supporting member, generally designated 48 in FIG. 1, will be positioned adjacent the right-hand end of the rail system shown in FIG. 2 and will bridge the gap between the rail section supporting member 30 and a next adjacent supporting member 49 which is illustrated as the location or position of a specially designed bottle spinning location.

Figure 5:
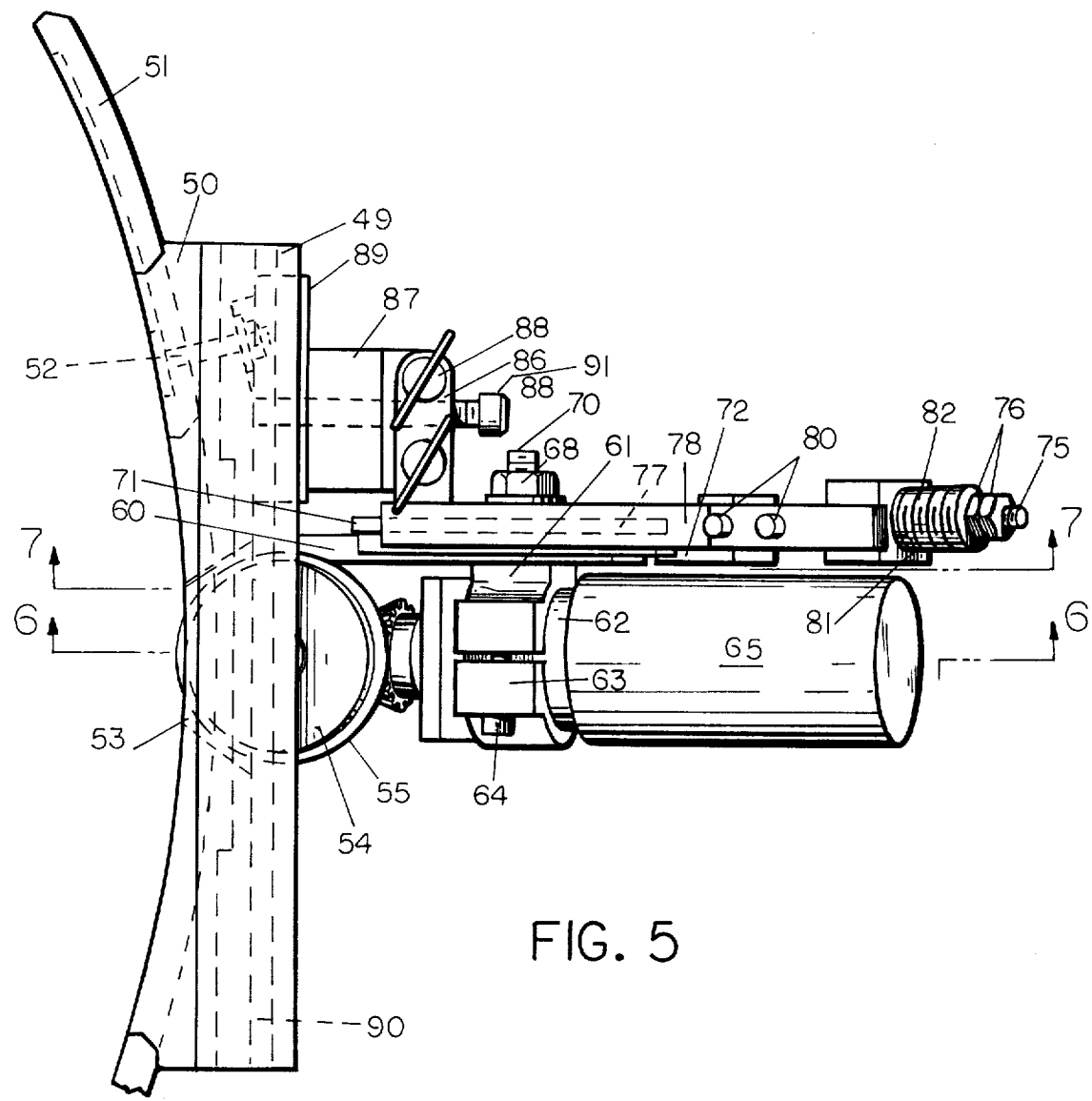
FIG. 5 is a top plan view of another section of the guide rail of the invention that includes a bottle spinning mechanism.
Figure 6:
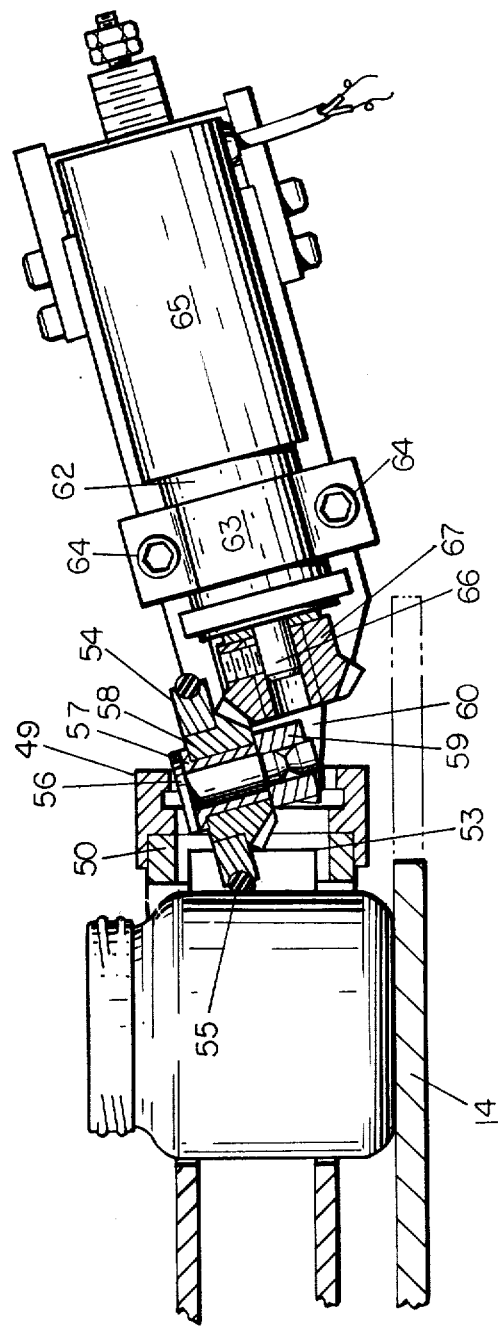
FIG. 6 is a cross-sectional view taken at line 6—6 of FIG. 5.
Figure 7:
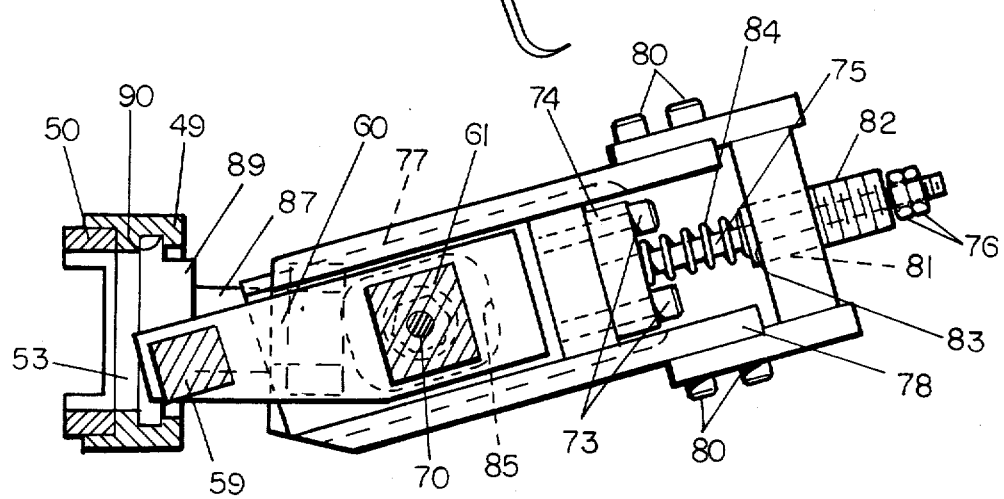
FIG. 7 is a cross-sectional view taken at line 7—7 of FIG. 5.

With particular reference to FIGS. 5–7, the bottle-spinning mechanism associated with the rail system will be described in detail. The supporting member 49 is a generally horizontal member to which a bottle-engaging block 50 is secured. The block 50 has an undercut which extends substantially the full length thereof, at the upper end, as viewed in FIG. 5. A gap-spanning member 51, similar to the previously described member 35, is adjustably fastened to the block 50 by a bolt 52. A cut-out opening is provided through the mounting member 49 and the block 50 which generally has the appearance of a truncated cone when viewed from above. This gap or opening is designated by reference numeral 53. Through this gap extends a driving wheel 54. The wheel 54 has a bottle-engaging surface 55, similar in appearance to an O-ring. This surface 55 may be made of rubber or other non-abrasive material, so that upon rotation of the wheel 54 in contact with the ware, little damage will be experienced by the ware. The wheel 54 is mounted on a spindle 56 via a sleeve-bearing 57 and a bevel gear 58. The spindle 56 is carried by a mounting block 59 which is formed as a part of an elongated casting 60, which also carries a boss 61 that flares outwardly into a generally semi-cylindrical sleeve clamp half. Within the boss 61 is positioned a barrel or sleeve 62 clamped by a semi-cylindrical cap 63 by a pair of bolts 64. The barrel 62 actually serves as the support for a drive motor 65. The motor 65 has its drive shaft 66 extending through the barrel mounting 62 and carries at its extending end a bevel gear 67 which is in engagement with the bevel gear 58.

The casting 60, opposite the boss 61, has a threaded bolt 70 to which is threaded a nut 68. The bolt 70 extends through a slide 71 and the nut 68 clamps the slide 71 and casting 60 together for movement as a unit. The slide 71 is formed with an angle portion 72 at its right-hand end as viewed in FIGS. 5 and 7. The angle portion 72 is bolted by bolts 73 to a cross head 74. The cross head 74 has a rod 75 extending therefrom with the outer end of the rod being threaded to receive a pair of lock nuts 76 whose function, as later explained, is to limit the extent of movement in one direction of the driving wheel relative to the guide rail system.

The slide 71 is retained in a slideway channel 77 formed in the face of an elongated mounting plate 78. The plate 78, at one end thereof, carries a generally "U" shaped bracket 79 bolted thereto by bolts 80. The center of the bracket is provided with a central, internally threaded opening 81 within which threaded sleeve 82 is retained. One end of the sleeve carries an annular recess 83, surrounding an opening through which the rod 75 extends. This surface 83 serves as an abutting surface for a compression spring 84 with the other end of the spring being confined by the cross head 74.

The mounting plate 78 is formed with an elongated opening 85 therein through which the bolt 79 extends so that the slide 71 may move relative to the mounting plate 78. The mounting plate 78 carries a pair of mounting brackets 86 (only one of which is shown) that are pinned to boss 87 by a pair of pins 88 of the ring pull, quick-disconnect, type. The boss 87 is welded to a dovetail slide 89 that fits within slideway 90 in the supporting member 49. A bolt 91 threaded in the boss 87 has its inner end in abutting relation to the inside of the slideway 90 and when tightened, will serve to fix the position of the boss 87 relative to the supporting member 49.

In actual operation of the ware-rotating system, when a container arrives at the position opposite the wheel 54, the wheel will be moved slightly to the right as viewed in FIG. 6 against the action of the spring 84. As would be expected, the nuts 76 will also be moved slightly to the right. After movement of the container out of the position opposite the drive wheel, the wheel will move to the left under the action of the spring to the extent that the nuts 76 come in contact with the end of the sleeve 82. This provides an arrangement where the wheel actually is held against a piece of glassware with sufficient force to assure rotation thereof without slippage and at the same time the wheel is kept from moving too far to the left between movements of the ware. If the wheel were free to move to the left an appreciable amount, inspecting of the ware with the wheel could occur.

With the foregoing in mind, it can be seen that a fully adjustable bottle-handling system is provided which also includes a rotation station that incorporates the guide rail system as a part of the mounting for the drive means.

We claim:

1. In a multiple station glass container inspection machine wherein the ware is moved from station to station by an indexing of a series of pocket members in the form of an endless chain and wherein the ware is maintained in said pocket members by a side-engaging rail system, the improvement in the rail system comprising:

a plurality of individual rail members having a predetermined configuration, said rail members forming an uninterrupted rail that surrounds the outer periphery of the inspection machine, each rail member comprising a vertical post adjustably mounted to the inspection machine;

a horizontal rod mounted to the upper end of said vertical post, a dovetail member mounted on one of said rod;

a horizontal, slotted channel having a slot within which said dovetail is mounted for relative movement;

a bottle-engaging rail facing on said slotted channel opposite said slot, said facing being formed with a slotted area adjacent one end thereof and means mounted in said slotted area and engageable with the next adjacent member so as to bridge any gap therebetween.

2. In a multiple station, glass container inspection machine wherein the ware is moved from station to station by the indexing movement of a series of pocket members in the form of an endless chain and wherein the ware is maintained in said pocket members by a side-engaging rail system, the improvement in the rail system comprising:

a plurality of individual rail sections having a predetermined configuration, said rail sections forming an uninterrupted rail that surrounds the outer periphery of the inspection machine;

said rail sections comprising:
(a) vertically adjustable posts mounted to the side of the inspection machine;
(b) a horizontal rod mounted to the upper end of each said vertical post;
(c) a dovetail member mounted on one end of said rod;
(d) a generally straight, horizontal member having a slotted channel on one side thereof within which said dovetail is mounted for relative horizontal movement;
(e) a bottle-engaging facing on said horizontal member opposite said slotted channel, said bottle-engaging facing being formed with a slotted area adjacent one end thereof and means mounted in said slotted area and engageable with the next adjacent member so as to bridge any gap therebetween.

* * * * *